(12) United States Patent
Dahl (10) Patent No.: US 8,402,281 B2
(45) Date of Patent: *Mar. 19, 2013

(54) DATA SECURITY SYSTEM FOR A DATABASE

(75) Inventor: Ulf Dahl, Old Greenwich, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,274

(22) Filed: Oct. 29, 2010

(65) Prior Publication Data

US 2011/0246788 A1    Oct. 6, 2011

Related U.S. Application Data

(63) Continuation of application No. 11/603,967, filed on Nov. 21, 2006, now abandoned, and a continuation of application No. 09/840,188, filed on Apr. 24, 2001, now abandoned, which is a continuation of application No. 09/027,585, filed as application No. PCT/SE97/01089 on Jun. 18, 1997, now Pat. No. 6,321,201.

(30) Foreign Application Priority Data

Jun. 20, 1996   (SE) .................................... 9602475

(51) Int. Cl.
    *G06F 12/14*    (2006.01)
(52) U.S. Cl. .......................................... 713/189; 705/51
(58) Field of Classification Search ........................ None
    See application file for complete search history.

(56) References Cited

U.S. PATENT DOCUMENTS

| | | | |
|---|---|---|---|
| 4,218,582 A | 8/1980 | Hellman et al. | |
| 4,375,579 A | 3/1983 | Davida et al. | |
| 4,405,829 A | 9/1983 | Rivest et al. | |
| 4,417,338 A | 11/1983 | Davida | |
| 4,424,414 A | 1/1984 | Hellman et al. | |

(Continued)

FOREIGN PATENT DOCUMENTS

| | | |
|---|---|---|
| EP | 1207443 A2 | 5/2002 |
| EP | 1207462 A2 | 5/2002 |

(Continued)

OTHER PUBLICATIONS

Japanese First Office Action, Japanese Application No. 10-502818, May 22, 2007, 17 pages.
Japanese Second Office Action, Japanese Application No. 1998-502818, Feb. 5, 2008, pages.
Transcript from Telephone Conference on Oral Ruling on Claim Construction Before Judge Chatigny, Jul. 24, 2012, 39 pages, *Protegrity Corp.* vs. *Ingrian Networks, Inc. et al., Protegrity Corp.* vs. *Voltage Security, Protegity Corp.* vs. *Nubridges Inc.*, (District of Connecticut) (Case Nos. 3:08CV618(RNC), 3:10CV755(RNC), 3:10CV809(RNC)).

(Continued)

*Primary Examiner* — Kaveh Abrishamkar
(74) *Attorney, Agent, or Firm* — Fenwick & West LLP (57) ABSTRACT

A method and an apparatus for processing data provides protection for the data. The data is stored as encrypted data element values (DV) in records (P) in a first database (0-DB), each data element value being linked to a corresponding data element type (DT). In a second database (IAM-DB), a data element protection catalogue (DC) is stored, which for each individual data element type (DT) contains one or more protection attributes stating processing rules for data element values (DV), which in the first database (0-DB) are linked to the individual data element type (DT). In each user-initiated measure which aims at processing a given data element value (DV) in the first database (0-DB), a calling is initially sent to the data element protection catalogue for collecting the protection attribute/attributes associated with the corresponding data element types. The user's processing of the given data element value is controlled in conformity with the collected protection attribute/attributes.

60 Claims, 4 Drawing Sheets

U.S. PATENT DOCUMENTS

| | | | |
|---|---|---|---|
| 4,649,233 A | 3/1987 | Bass et al. | |
| 4,757,534 A | 7/1988 | Matyas et al. | |
| 4,827,508 A | 5/1989 | Shear | |
| 4,850,017 A | 7/1989 | Matyas, Jr. et al. | |
| 4,876,716 A | 10/1989 | Okamoto | |
| 4,935,961 A | 6/1990 | Gargiulo et al. | |
| 4,955,082 A | 9/1990 | Hattori et al. | |
| 4,956,769 A | 9/1990 | Smith | |
| 5,136,642 A | 8/1992 | Kawamura et al. | |
| 5,148,481 A * | 9/1992 | Abraham et al. | 380/46 |
| 5,150,411 A | 9/1992 | Maurer | |
| 5,265,164 A | 11/1993 | Matyas et al. | |
| 5,265,221 A | 11/1993 | Miller | |
| 5,271,007 A | 12/1993 | Kurahashi et al. | |
| 5,283,830 A | 2/1994 | Hinsley et al. | |
| 5,343,527 A | 8/1994 | Moore | |
| 5,355,474 A | 10/1994 | Thuraisngham et al. | |
| 5,369,702 A | 11/1994 | Shanton | |
| 5,375,169 A | 12/1994 | Seheidt et al. | |
| 5,396,623 A | 3/1995 | McCall et al. | |
| 5,438,508 A | 8/1995 | Wyman | |
| 5,446,903 A | 8/1995 | Abraham et al. | |
| 5,459,860 A | 10/1995 | Burnett et al. | |
| 5,493,668 A | 2/1996 | Elko et al. | |
| 5,504,814 A | 4/1996 | Miyahara | |
| 5,606,610 A | 2/1997 | Johansson | |
| 5,659,614 A | 8/1997 | Bailey, III | |
| 5,661,799 A | 8/1997 | Nagel et al. | |
| 5,678,041 A | 10/1997 | Baker et al. | |
| 5,680,452 A | 10/1997 | Shanton | |
| 5,699,428 A | 12/1997 | McDonnal et al. | |
| 5,706,507 A | 1/1998 | Schloss | |
| 5,717,755 A | 2/1998 | Shanton | |
| 5,751,949 A * | 5/1998 | Thomson et al. | 726/4 |
| 5,757,908 A | 5/1998 | Cooper et al. | |
| 5,768,276 A | 6/1998 | Diachina et al. | |
| 5,778,365 A | 7/1998 | Nishiyama | |
| 5,787,175 A | 7/1998 | Carter | |
| 5,898,781 A | 4/1999 | Shanton | |
| 5,915,017 A | 6/1999 | Sung et al. | |
| 5,915,025 A | 6/1999 | Taguchi et al. | |
| 5,917,915 A | 6/1999 | Hirose | |
| 5,933,498 A | 8/1999 | Schneck et al. | |
| 5,940,507 A | 8/1999 | Cane et al. | |
| 5,949,876 A | 9/1999 | Ginter | |
| 5,963,642 A | 10/1999 | Goldstein | |
| 6,078,925 A | 6/2000 | Anderson et al. | |
| 6,098,076 A | 8/2000 | Rekieta et al. | |
| 6,098,172 A | 8/2000 | Coss et al. | |
| 6,112,199 A | 8/2000 | Nelson | |
| 6,122,640 A | 9/2000 | Pereira | |
| 6,172,664 B1 | 1/2001 | Nakasuji et al. | |
| 6,199,582 B1 | 3/2001 | Matsuzawa et al. | |
| 6,321,201 B1 | 11/2001 | Dahl | |
| 6,397,330 B1 | 5/2002 | Elgamal et al. | |
| 6,421,688 B1 | 7/2002 | Song | |
| 6,687,683 B1 | 2/2004 | Harada et al. | |
| 7,490,248 B1 | 2/2009 | Valfridsson et al. | |
| 8,316,051 B1 * | 11/2012 | Burns et al. | 707/783 |

FOREIGN PATENT DOCUMENTS

| | | |
|---|---|---|
| EP | 1209550 A2 | 5/2002 |
| EP | 1211589 A2 | 6/2002 |
| GB | 2 242 295 A | 9/1991 |
| GB | 2 248 951 A | 4/1992 |
| JP | 3-276936 | 12/1991 |
| JP | 06-175842 A | 6/1994 |
| JP | 7-219900 | 8/1995 |
| JP | 7-262072 A | 10/1995 |
| JP | 7-295876 A | 11/1995 |
| JP | 7-295892 A | 11/1995 |
| RU | 2 022 343 C1 | 10/1994 |
| RU | 2067313 | 9/1996 |
| SE | 507-138 | 4/1998 |
| WO | WO 93/11619 | 6/1993 |
| WO | WO 95/14266 A1 | 5/1995 |
| WO | WO 95/15628 | 6/1995 |
| WO | WO 95/22792 | 8/1995 |
| WO | WO 97/49211 | 12/1997 |
| WO | WO 98/17039 | 4/1998 |
| WO | WO 01/35226 | 5/2001 |

OTHER PUBLICATIONS

Transcript from Markman Hearing Before Judge Chatigny, May 11, 2012, 167 pages, *Protegrity Corp. vs. Ingrian Networks, Inc. et al., Protegrity Corp. vs. Voltage Security, Protegity Corp. vs. Nubridges Inc.*, (District of Connecticut) (Case Nos. 3:08CV618(RNC), 3:10CV755(RNC), 3:10CV809(RNC)).

Chinese Office Action, Chinese Application No. 97195668.5, Dec. 27, 2002, 10 pages.

Defendants' Fourth Supplemental Revised Invalidity Contentions Concerning the '201 and '980 Patents, Sep. 3, 2012, 19 pages, *Protegrity Corp. vs. Ingrian Networks, Inc.* and *Safenet, Inc.*, (District of Connecticut) (Case No. 3:08-CV-618 (RNC)).

Exhibits 2A-2M, Defendants' Fourth Supplemental Revised Invalidity Contentions Concerning the '201 and '980 Patents, Sep. 3, 2012, 391 pages, *Protegrity Corp. vs. Ingrian Networks, Inc.* and *Safenet, Inc.*, (District of Connecticut) (Case No. 3:08-CV-618 (RNC)).

Exhibit 3, Defendants' Fourth Supplemental Revised Invalidity Contentions Concerning the '201 and '980 Patents, Sep. 3, 2012, 28 pages, *Protegrity Corp. vs. Ingrian Networks, Inc.* and *Safenet, Inc.*, (District of Connecticut) (Case No. 3:08-CV-618 (RNC)).

IBM S/390 Cryptographic Coprocessor Receives Highest Validation for Commercial Security, Defendants' Fourth Supplemental Revised Invalidity Contentions Concerning the '201 and '980 Patents, Sep. 3, 2012, 2 pages, *Protegrity Corp. vs. Ingrian Networks, Inc.* and *Safenet, Inc.*, (District of Connecticut) (Case No. 3:08-CV-618 (RNC)).

IBM OS/390 Version 2 Release 8 Availability and Release 9, Defendants' Fourth Supplemental Revised Invalidity Contentions Concerning the '201 and '980 Patents, Sep. 3, 2012, 31 pages, *Protegrity Corp. vs. Ingrian Networks, Inc.* and *Safenet, Inc.*, (District of Connecticut) (Case No. 3:08-CV-618 (RNC)).

OS/390 Version 2 Release 7 Availability and Release 8, Defendants' Fourth Supplemental Revised Invalidity Contentions Concerning the '201 and '980 Patents, Sep. 3, 2012, 32 pages,*Protegrity Corp. vs. Ingrian Networks, Inc.* and *Safenet, Inc.*, (District of Connecticut) (Case No. 3:08-CV-618 (RNC)).

Defendant Ingrian Networks, Inc.'s Preliminary Invalidity Contentions, Jan. 30, 2009, 63 pages, *Protegrity Corporation vs. Ingrian Networks, Inc.* (District of Connecticut) (Civil Action No. 3:08-cv-618 (RNC)).

Defendant Ingrian Networks, Inc.'s Revised Invalidity Contentions, Apr. 21, 2010, 65 pages, *Protegrity Corporation vs. Ingrian Networks, Inc.* (District of Connecticut) (Civil Action No. 3:08-cv-618 (RNC)).

Defendant Ingrian Networks, Inc.'s Supplemental Revised Invalidity Contentions, Apr. 1, 2011, 71 pages, *Protegrity Corporation vs. Ingrian Networks, Inc.* (District of Connecticut) (Civil Action No. 3:08-cv-618 (RNC)).

Defendants' Second Supplemental Revised Invalidity Contentions Concerning the '201 Patent, Nov. 14, 2011, 19 pages, *Protegrity Corporation v. Ingrian Networks, Inc.* and *Safenet, Inc.*, (District of Connecticut) (Civil Action No. 3:08-CV-618 (RNC)).

Defendants' Third Supplemental Revised Invalidity Contentions Concerning the '201 Patent, May 9, 2012, *Protegrity Corporation v. Ingrian Networks, Inc.* and *Safenet, Inc.*, (District of Connecticut) (Civil Action No. 3:08-CV-618 (RNC)).

Exhibit 2A-2M, Defendants' Third Supplemental Revised Invalidity Contentions Concerning the '201 Patent, May 9, 2012, *Protegrity Corporation v. Ingrian Networks, Inc.* and *Safenet, Inc.*, (District of Connecticut) (Civil Action No. 3:08-CV-618 (RNC)).

U.S. Patent 5,548,648, Defendants' Third Supplemental Revised Invalidity Contentions Concerning the '201 Patent, May 9, 2012, *Protegrity Corporation v. Ingrian Networks, Inc.* and *Safenet, Inc.*, (District of Connecticut) (Civil Action No. 3:08-CV-618 (RNC)).

Defendant nuBridges, Inc.'s Initial Invalidity Contentions, Feb. 1, 2011, 23 pages, *Protegrity Corporation* v. *nuBridges, Inc.*, (District of Connecticut) (Case No. 3:10-cv-00809-RNC).

Appendix A, Nubridges Invalidity Contentions, Feb. 1, 2011, 173 pages, *Protegrity Corporation* v. *nuBridges, Inc.*, (District of Connecticut) (Case No. 3:10-cv-00809-RNC).

Defendant nuBridges, Inc.'s Amended Initial Invalidity Contentions, Nov. 14, 2011, 386 pages, *Protegrity Corporation* v. *nuBridges, Inc.*, (District of Connecticut) (Case No. 3:10-cv-00809-RNC).

Defendant's Initial Invalidity Contentions, *Protegrity Corporation* v. *Voltage Security, Inc.*, Oct. 15, 2010, 14 pages, (District of Connecticut), (Case No. 3:10-CV-755 (RNC)).

Exhibit A, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit B, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit C, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit D, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit E, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit F, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit G, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit H, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit I, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit J, Voltage Invalidity Chart, 4 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit K, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit L, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit M, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit N, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit 0, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit P, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit Q, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit R, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit S, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit T, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit U, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit V, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit W, Voltage Invalidity Chart, 2 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit X, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit Y, Voltage Invalidity Chart, 3 pages, Defendant's Initial Invalidity Contentions, *Protegrity Corporation* v. *Voltage Security, Inc.*, Oct. 15, 2010, (District of Connecticut), (Case No. 3:10-CV-755 (RNC)).

Exhibit A, Invalidity Chart, U.S. Patent 6,321,201, 10 pages, Dec. 16, 2011.

Exhibit B, Invalidity Chart, U.S. Patent 6,321,201, 9 pages, Dec. 16, 2011.

Exhibit C, Invalidity Chart, U.S. Patent 6,321,201, 15 pages, Dec. 16, 2011.

Exhibit D, Invalidity Chart, U.S. Patent 6,321,201, 16 pages, Dec. 16, 2011.

Exhibit E, Invalidity Chart, U.S. Patent 6,321,201, 9 pages, Dec. 16, 2011.

Exhibit F, Invalidity Chart, U.S. Patent 6,321,201, 9 pages, Dec. 16, 2011.

Exhibit G, Invalidity Chart, U.S. Patent 6,321,201, 16 pages, Dec. 16, 2011.

Exhibit H, Invalidity Chart, U.S. Patent 6,321,201, 10 pages, Dec. 16, 2011.

Exhibit I, Invalidity Chart, U.S. Patent 6,321,201, 9 pages, Dec. 16, 2011.

Exhibit J, Invalidity Chart, U.S. Patent 6,321,201, 10 pages, Dec. 16, 2011.

Exhibit K, Invalidity Chart, U.S. Patent 6,321,201, 10 pages, Dec. 16, 2011.

Exhibit L, Invalidity Chart, U.S. Patent 6,321,201, 13 pages, Dec. 16, 2011.

Exhibit M, Invalidity Chart, U.S. Patent 6,321,201, 10 pages, Dec. 16, 2011.

Exhibit N, Invalidity Chart, U.S. Patent 6,321,201, 9 pages, Dec. 16, 2011.

Exhibit O, Invalidity Chart, U.S. Patent 6,321,201, 10 pages, Dec. 16, 2011.

Exhibit P, Invalidity Chart, U.S. Patent 6,321,201, 9 pages, Dec. 16, 2011.

Exhibit Q, Invalidity Chart, U.S. Patent 6,321,201, 9 pages, Dec. 16, 2011.
Exhibit R, Invalidity Chart, U.S. Patent 6,936,980, 3 pages, Dec. 16, 2011.
Exhibit S, Invalidity Chart, U.S. Patent 6,936,980, 2 pages, Dec. 16, 2011.
Exhibit T, Invalidity Chart, U.S. Patent 6,936,980, 3 pages, Dec. 16, 2011.
Exhibit U, Invalidity Chart, U.S. Patent 7,325,129, 8 pages, Dec. 16, 2011.
Exhibit V, Invalidity Chart, U.S. Patent 7,325,129, 8 pages, Dec. 16, 2011.
Exhibit W, Invalidity Chart, U.S. Patent 7,325,129, 8 pages, Dec. 16, 2011.
Exhibit X, Invalidity Chart, U.S. Patent 6,321,201, 10 pages, Dec. 16, 2011.
Exhibit Y, Invalidity Chart, U.S. Patent 6,963,980, 3 pages, Dec. 16, 2011.
Exhibit Z, Invalidity Chart, U.S. Patent 6,321,201, 24 pages, Dec. 16, 2011.
Exhibit AA, Invalidity Chart, U.S. Patent 6,321,201, 40 pages, Dec. 16, 2011.
Exhibit BB, Invalidity Chart, U.S. Patent 6,321,201, 41 pages, Dec. 16, 2011.
Exhibit CC, Invalidity Chart, U.S. Patent 6,321,201, 26 pages, Dec. 16, 2011.
Exhibit DD, Invalidity Chart, U.S. Patent 6,321,201, 36 pages, Dec. 16, 2011.
Exhibit EE, Invalidity Chart, U.S. Patent 6,321,201, 28 pages, Dec. 16, 2011.
Exhibit FF, Invalidity Chart, U.S. Patent 6,321,201, 4 pages, Dec. 16, 2011.
Exhibit GG, Invalidity Chart, U.S. Patent 6,321,201, 3 pages, Dec. 16, 2011.
Exhibit HH, Invalidity Chart, U.S. Patent 6,321,201, 4 pages, Dec. 16, 2011.
Exhibit II, Invalidity Chart, U.S. Patent 6,321,201, 8 pages, Dec. 16, 2011.
Exhibit JJ, Invalidity Chart, U.S. Patent 6,321,201, 21 pages, Dec. 16, 2011.
Prior Art, Voltage 010946, 6 pages, Dec. 16, 2011.
Prior Art, Voltage 010952, 16 pages, Dec. 16, 2011.
Prior Art, Voltage 010968, 18 pages, Dec. 16, 2011.
Prior Art, Voltage 010986, 20 pages, Dec. 16, 2011.
Prior Art, Voltage 011006, 13 pages, Dec. 16, 2011.
Prior Art, Voltage 011019, 12 pages, Dec. 16, 2011.
Prior Art, Voltage 011031, 13 pages, Dec. 16, 2011.
Prior Art, Voltage 011044, 2 pages, Dec. 16, 2011.
Prior Art, Voltage 011046, 3 pages, Dec. 16, 2011.
Prior Art, Voltage 011049, 11 pages, Dec. 16, 2011.
Prior Art, Voltage 011060, 10 pages, Dec. 16, 2011.
Prior Art, Voltage 011070, 10 pages, Dec. 16, 2011.
Prior Art, Voltage 011080, 14 pages, Dec. 16, 2011.
Prior Art, Voltage 011094, 9 pages, Dec. 16, 2011.
Prior Art, Voltage 011103, 23 pages, Dec. 16, 2011.
Prior Art, Voltage 011126, 6 pages, Dec. 16, 2011.
Prior Art, Voltage 011132, 10 pages, Dec. 16, 2011.
Prior Art, Voltage 011142, 4 pages, Dec. 16, 2011.
Prior Art, Voltage 011146, 6 pages, Dec. 16, 2011.
Prior Art, Voltage 011152, 30 pages, Dec. 16, 2011.
Prior Art, Voltage 011182, 21 pages, Dec. 16, 2011.
Prior Art, Voltage 011203, 14 pages, Dec. 16, 2011.
Prior Art, Voltage 011217, 12 pages, Dec. 16, 2011.
Prior Art, Voltage 011229, 27 pages, Dec. 16, 2011.
Prior Art, Voltage 011256, 42 pages, Dec. 16, 2011.
Prior Art, Voltage 011298, 28 pages, Dec. 16, 2011.
Prior Art, Voltage 011326, 8 pages, Dec. 16, 2011.
Soo, D. et al., "A Protection of Computers," Moscow, 1982, 137-162.
Spesivtcev, A.V. et al., "An Information Protection in Personal Computers," Moscow, 1992, pp. 25-26.
Hooper et al: "Related databases: An Accountant's primer", Management Accounting, Oct. 1996, v78, n4, pp. 48-53.

Kelter, U.: Discretionary access controls in a high-performance object management system; p. 266-299in: Proc. 1991 IEEE Symposium on Research in Security and Privacy, Oakland, California, 20-22.05.1991; IEEE Computer Society Press; May 1991.
Charles P. Pfleeger. Security in Computing. Englewood Cliffs, New Jersey: PTR Prentice-Hall, 1989 (especially ch. 8, "Data Base Security.").
Patent Office of the Russian Federation, Search Report, Application No. 99100700, Jun. 18, 1997.
David K. Gifford, "Cryptographic Sealing for Information Secrecy and Authentication." Communications of the ACM, vol. 25, No. 4 (Apr. 1982), pp. 274-286.
R.W. Conway, W.L. Maxwell, and H.L. Morgan, "On the Implementation of Security Measures in Information Systems." Communications of the ACM, vol. 15, No. 4 (Apr. 1972), pp. 211-220.
Masaaki Mizuno and Mitchell L. Neilsen, "A Secure Quorum Protocol." Proceedings of the 14th National Computer Security Conference (Oct. 1-4, 1991), pp. 514-523.
E. John Sebes and Fichard J. Feiertag, "Trusted Distributed Computing: Using Untrusted Network Software." Proceedings of the 14th National Computer Security Conference (Oct. 1-4, 1991), pp. 608-618.
Vijay Varadharajan, "A Security Reference Model for a Distributed Object System and its Application." Proceedings of the 15th National Computer Security Conference (Oct. 13-16, 1992), pp. 593-619.
George I. Davida and Y. Yeh. "Cryptographic Relational Algebra." Proceedings of the 1982 Symposium on Security and Privacy (Apr. 26-28, 1982), pp. 111-116.
Dorothy E. Denning. "Cryptographic Checksums for Multilevel Database Security." Proceedings of the 1984 Symposium on Security and Privacy (Apr. 29-May 2, 1984), pp. 52-61.
S.G. Akl and P .D. Taylor, "Cryptographic Solution to B Multilevel Security Problem," in D. Chaum, L. Rivest, and A. T. Shennan (eds), Advances in Cryptology Proceedings of CRYPTO '82. New York: Plenum Press, Aug. 1982, pp. 237-250.
George I. Davida, David L. Wells, and John B. Kam, "A Database Encryption System With Subkeys." ACM Transactions on Database Systems vol. 6, No. 2 (Jun. 1982), p. 5.
D. Woelk and W. Kim, "Multimedia Information Management in an Object-Oriented Database System" Proceedings of the 13th International Conference on Very Large Databases. Brighton, England. 1987.
D. G. Abraham et al., "Transaction Security System "IBM Systems Journal, vol. 30, No. 2, 1991, pp. 206-229.
D. B. Johnson et al., "Common Cryptographic Architecture Cryptographic Application Programming Interface." IBM Systems Journal, vol. 30. No. 2, 1991, pp. 130-150.
David K. Hsiao, et at., "Database Access Control in the Presence of Context Dependent Protection Requirements." IEEE Transactions on Software Engineering, vol. SE-5, No. 4, Jul. 1979. pp. 349-358.
Matthew Morgenstern "Controlling Logical Inference in Multilevel Database Systems." Proceedings of the 1988 Symposium on Security and Privacy, The Computer Society of the IEEE, Apr. 18-21, 1988, Oakland, California, pp, 245-255.
Patent prosecution history, PCT Patent Application No. PCT/SE97/01644, 2007.
Patent prosecution history, Swedish Patent Application No. 9603753, 2007.
Application Security, Inc., DbEncrypt™ for Oracle User Guide, 2007.
Patent prosecution history, European Patent Office Patent Application No. 97 928 615.0 (filed Jun. 18, 1997).
Patent prosecution history, U.S. Appl. No. 09/027,585, United States Patent No. 6,321,201 (filed Feb. 23, 1998).
P.A. Dwyer, el al., "Query Processing in LDV: A Secure Database System," Fourth Aerospace Computer Security Applications Conference, Dec. 12-16, 1988; IEEE Computer Society Press, pp. 118-124.
Cristi Garvey, et al, "ASD Views," Proceedings 1988 Symposium on Security and Privacy, Apr. 18-21, 1988, pp. 85-95.
Richard D. Graubart, et al., "Design Overview for Retrofitting Integrity-Lock Architecture onto a Commercial DBMS," Proceedings of the 1985 Symposium on Security and Privacy. Apr. 22-24, 1985, pp. 147-159.

Patricia A. Rougeau et al., The Sybase Secure Dataserver: A Solution to the Multilevel Secure DBMS Problem, 10th National Bureau of Standards National Computer Security Center, Sep. 21-24, 1987, pp. 211-215.

Billy G. Claybrook, "Using Views in Multilevel Secure Database Management System, Proceedings of the 1983 Symposium on Security and Privacy," Apr. 25-27, 1983, pp. 4-17.

Dorothy E. Denning, et al., "Views for Multilevel Database Security," IEEE Transactions on Software Engineering, Feb. 1987, vol. SE-13:2, pp. 129-140.

Catherine Meadows, "Extending the Brewer-Nash Model to a Multilevel Context," Proceedings 1990 IEEE Computer Society Symposium on Research in Security and Privacy, May 7-9, 1990, pp. 95-102.

Dorothy E. Denning, "Commutative Filters for Reducing Inference Threats in Multilevel Database Systems," Proceedings of the 1985 Symposium on Security and Privacy, Apr. 22-24, 1985, pp. 134-146.

Elisa Bertino, "Data Hiding Security in Object-Oriented Databases," Eighth International Conference on Data Engineering, Feb. 2-3, 1992, pp. 338-347.

William T. Maimone, et al., "Single-Level Multiversion Schedulers for Multilevel Secure Database Systems,"1990 IEEE. pp. 137-147.

P.C. Yeh, et al., "ESA/390 Integrated Cryptographic Facility: An Overview," IBM Systems Journal, vol. 30:2, 1991, pp. 193-205.

IBM, "Application Programming and SQL Guide," IBM Database 2 Version 2, Release 3, Mar. 1992, pp. 30-33, 48, 82, 102, 106, 286, 529.

Stephen L. Montgomery, "Relational Database Design and Implementation Using DB2", 1990, pp. 10-11.

Bruce L. Larson, "The Database Experts' Guide to Database 2," McGraw Hill, 1988, p. 23 & App. B.

Deborah Downs, et al., "A Kernel Design for a Secure Data Base Management System," Proceedings Very Large Data Bases, Oct. 6-8, 1977 pp. 507-514.

Gary W. Smith, "Multilevel Secure Database Design: A Practical Application," IEEE, 1990, pp. 314-321.

Thomas H. Hinke, The Trusted Server Approach to Multilevel Security, IEEE, 1990, pp. 335-341.

Li Gong, "A Secure Identity-Based Capability System," University of Cambridge Computer Laboratory, England, Jan. 1989, pp. 1-16.

Sushil Jajodia, et al., "Integrating an Object-Oriented Data Model with Multilevel Security," IEEE, 1990, pp. 76-85.

Dorothy E. Denning, "Field Encryption and Authentication," Proceedings of Crypto 83, Advances in Cryptology, 1983, pp. 231-247.

C. C. Chang, "An Information Protection Scheme Based upon Number Theory," The Computer Journal, vol. 30:3, 1987, pp. 249-253.

Rafial Ahad, et al., "Supporting Access Control in an Object-Oriented Database Language," Advances in Database Technology EDBT 1992, pp. 184-200.

Ravioderpal S. Sandhu, "Cryptographic Implementation of a Tree Hierarchy for Access Control," Infotmation Processing Letters, vol. 27:2, Feb. 29, 1988, pp. 95-98.

Lein Ham, et al., "A Cryptographic Key Generation Scheme for Multilevel Data Security," Computers & Security, vol. 9:6, Oct. 1990, pp. 539-546.

Gerald C. Chick, et al., "Flexible Access Control with Master Keys," Advances in Cryptology-CRYPTO, 1989, pp. 316-322.

Shirley Eichenwald, "Information Technologies Physician-Hospital Networks," Journal of AHIMA; vol. 63:3, Mar. 1992, pp. 50-51.

E. John Sebes, et al., "Trusted Distributed Computing: Using Untrusted Network Software," 14th National Computer Security Conference, Oct. 1-4, 1991, pp. 608-618.

IBM, "DB2 for OS/390 VS Administration Guide," available at http://publibz.boulderibm.com/cgi-bin/bookmgr_OS39O/BOOKS/DSNAG0F6/CONTENTS?SHELF=&DT=200004201654, §§ B.2, B.3.2, B.3.4, B.3.3, B.7.4, B.7, 2007.

Д СЯ О et al., "ЗАЩИ ТА 3ВМ." (Moscow 1982), pp. 137-162.

Patent Abstracts of Japan, Publication No. 03-276936, Publication Date: Dec. 9, 1991.

А. В. СЛеСИВЦ еВ et al., "ЗАЩИ ТА ИНФОРМАЦИИ : В ЛЕРСОНААЪ НЪ IX 3ВМ." (Moscow 1992), pp. 25-26.

Patent Abstracts of Japan, Publication No. 07-219900, Publication Date: Aug. 18, 1995.

Russian Search Report for PCT/SE97/01089, mailed Jun. 18, 1997.

Gaskell et al.; "Improved Security for Smart Card Use in DCE"; Feb. 1995; Open Software Foundation; Request for Comments: 71.0.; pp. 1-9.

Naccache et al. "Cryptographic Smart Cards" published in IEEE Micro 16(3),1996, pp. 1-14.

PCT International Search Report, PCT Application No. PCT/SE97/01089, Sep. 29, 1997, 2 pages.

PCT International-Type Search Report, Swedish Application No. 9602475-7, Jun. 20, 1996, 3 pages.

Australian Examiner's First Report, Australian Application No. 32823/97, Jan. 11, 2000, 1 page.

Australian Notice of Acceptance, Australian Application No. 32823/97, Aug. 4, 2000, 2 pages.

Canadian Office Action, Canadian Application No. 2,257,975, Aug. 5, 2004, 2 pages.

Joint Claim Construction Statement, Apr. 24, 2009, 20 pages, *Protegrity Corporation v. Ingrian Networks, Inc.*, (District of Connecticut) (Case No. 3:08-cv-00618-RNC).

Protegrity's Opening Claim Construction, Aug. 19, 2009, 39 pages, *Protegrity Corporation v. Ingrian Networks, Inc.*, (District of Connecticut) (Case No. 3:08-cv-00618-RNC).

Ingrian's Claim Construction Brief, Sep. 9, 2009, 49 pages, *Protegrity Corporation v. Ingrian Networks, Inc.*, (District of Connecticut) (Case No. 3:08-cv-00618-RNC).

Declaration of William J. Cass in Support of Ingrian's Claim Construction Brief, Sep. 9, 2009, 258 pages, *Protegrity Corporation v. Ingrian Networks, Inc.*, (District of Connecticut) (Case No. 3:08-cv-00618-RNC).

Protegrity's Reply in Support of Its Claim Construction, Sep. 23, 2009, 12 pages, *Protegrity Corporation v. Ingrian Networks, Inc.*, (District of Connecticut) (Case No. 3:08-cv-00618-RNC).

Letter Enclosing Joint Claim Construction Chart on CD-ROM, Dec. 28, 2009, 1 page, *Protegrity Corporation v. Ingrian Networks, Inc.*, (District of Connecticut) (Case No. 3:08-cv-00618-RNC).

Joint Claim Construction Chart, Dec. 28, 2009, 19 pages, *Protegrity Corporation v. Ingrian Networks, Inc.*, (District of Connecticut) (Case No. 3:08-cv-00618-RNC).

Motion of Defendants Ingrian Networks and Safenet, Inc. for a Stay Pending Reexamination, Jan. 14, 2011, 88 pages, *Protegrity Corporation v. Ingrian Networks, Inc.* and *Safenet, Inc.*, (District of Connecticut) (Case No. 3:08-cv-00618-RNC).

Protegrity's Opposition to Ingrian's Motion to Stay [Dkt. 90], Feb. 4, 2011, 104 pages, *Protegrity Corporation v. Ingrian Networks, Inc.*, (District of Connecticut) (Case No. 3:08-cv-00618-RNC).

Reply in Support of the Motion of Defendants Ingrian Networks, Inc. and Safenet, Inc. for a Stay Pending Reexamination, Feb. 14, 2011, 60 pages, *Protegrity Corporation v. Ingrian Networks, Inc.* and *Safenet, Inc.*, (District of Connecticut) (Case No. 3:08-cv-00618-RNC).

Supplemental Brief in Support of Defendants Ingrian Networks, Inc. and Safenet, Inc.'s Motion for Stay Pending Reexamination, Mar. 23, 2011, 4 pages, *Protegrity Corporation v. Ingrian Networks, Inc.*, (District of Connecticut) (Case No. 3:08-cv-00618-RNC).

Joint Claim Construction Statement for the '201 and '129 Patents, Jan. 20, 2012, pages, *Protegrity Corporation v. Ingrian Networks, Inc.* and *Safenet. Inc.*, (District of Connecticut) (Case No. 3:08-cv-00618-RNC), *Protegrity Corporation v. Voltage Security, Inc.*, (District of Connecticut) (Case No. 3:10-cv-755-RNC), *Protegrity Corporation v. nuBridges, Inc.*, (District of Connecticut) (Case No. 3:10-cv-809-RNC).

Protegrity's Motion to Dismiss Inequitable Conduct Counterclaims, Strike Ninth Affirmative Defense, and Incorporated Memorandum of Law, Mar. 9, 2012, 13 pages, *Protegrity Corporation v. Ingrian Networks, Inc.* and *Safenet, Inc.*, (District of Connecticut) (Case No. 3:08-cv-00618-RNC).

Ingrian's and Safenet's Answer and Counterclaims to Plaintiff's Second Amended Complaint, Mar. 12, 2012, 28 pages, *Protegrity Corporation v. Ingrian Networks, Inc.* and *Safenet, Inc.*, (District of Connecticut) (Case No. 3:08-cv-00618-RNC).

Defendants' Opening Claim Construction Brief for the '201 and '129 Patents, Mar. 13, 2012, 349 pages, *Protegrity Corporation v. Ingrian Networks, Inc.* and *Safenet, Inc.*, (District of Connecticut) (Case No.

3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Protegrity's Brief in Opposition to Defendants' Claim Construction for the '201 and '129 Patents [Ingrian Dkt. 186]. [Voltage Dkt. 139], [Nubridges Dkt. 89], Apr. 9, 2012, 78 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Protegrity's Reply in Support of Its Motion to Dismiss Inequitable Conduct Counterclaims and to Strike Ninth Affirmative Defense [Dkt. 184], Apr. 18, 2012, 8 pages, *Protegrity Corporation* v. *Ingrian Networks, Inc.*, and *Safenet, Inc.*, (District of Connecticut) (Case No. 3:08-cv-00618-RNC).

Defendants' Reply in Support of Their Opening Claim Construction Brief for the '201 and '129 Patents, Apr. 27, 2012, 28 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Revised Joint Claim Construction Statement for the '201 and '129 Patents, May 8, 2012, 17 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Defendant nuBridges, Inc.'s Memorandum of Law in Support of Motion for Stay Pending Reexamination, Jan. 21, 2011, 751 pages, *Protegrity Corporation* v. *nuBridges, Inc.*, (District of Connecticut) (Case No. 3:10-cv-00809-RNC).

Plaintiff's Opposition to nuBridges' Motion to Stay [Dkt. 25], Feb. 11, 2011, 312 pages, *Protegrity Corporation* v. *nuBridges, Inc.*, (District of Connecticut) (Case No. 3:10-cv-00809-RNC).

Defendant nuBridges, Inc.'s Reply Memorandum of Law in Further Support of Motion for Stay Pending Reexamination, Feb. 21, 2011, 202 pages, *Protegrity Corporation* v. *nuBridges, Inc.*, (District of Connecticut) (Case No. 3:10-cv-00809-RNC).

Joint Claim Construction Statement for the '201 and '129 Patents, Jan. 20, 2012, 20 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Protegrity's Motion to Dismiss Inequitable Conduct Counterclaim, Strike Fourth Affirmative Defense, and Incorporated Memorandum of Law, Mar. 9, 2012, 8 pages, *Protegrity Corporation* v. *nuBridges, Inc.*, (District of Connecticut) (Case No. 3:10-cv-00809-RNC).

Defendants' Opening Claim Construction Brief for the '201 and '129 Patents, Mar. 13, 2012, 36 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv809-RNC).

Declaration of Vernon E. Evans, Mar. 13, 2012, 313 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Protegrity's Brief in Opposition to Defendants' Claim Construction for the '201 and '129 Patents [Ingrian Dkt. 186], [Voltage Dkt. 139], [Nubridges Dkt. 89], Apr. 9, 2012, 78 pages, *Protegrity Corporation* v. *Ingrian Networks, Inc.* and *Safenet, Inc.*, (District of Connecticut) (Case No. 3:08-cv-00618-RNC). *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Stipulation and [Proposed] Order for Filing of nuBridges, Inc.'s Amended Answer to Plaintiff's First Amended Complaint, Affirmative Defenses, and Counterclaims, Apr. 12, 2012, 32 pages, *Protegrity Corporation* v. *nuBridges, Inc.*, (District of Connecticut) (Case No. 3:10-cv-00809-RNC).

Defendants' Reply in Support of Their Opening Claim Construction Brief for the '201 and '129 Patents, Apr. 27, 2012, 29 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Protegrity's Motion to Dismiss Inequitable Conduct Counterclaims, Strike Fourth Affirmative Defense, and Incorporated Memorandum of Law, Jun. 4, 2012, 643 pages, *Protegrity Corporation* v. *nuBridges, Inc.*, (District of Connecticut) (Case No. 3:10-cv-00809-RNC).

Defendant's Opposition to Protegrity's Motion to Dismiss Inequitable Conduct Counterclaims and to Strike Fourth Affirmative Defense, Jun. 28, 2012, 25 pages, *Protegrity Corporation* v. *nuBridges, Inc.*, (District of Connecticut) (Case No. 3:10-cv-00809-RNC).

Protegrity's Reply in Support of Its Motion to Dismiss Inequitable Conduct Counterclaims and to Strike Fourth Affirmative Defense [Dkt. 122], Jul. 24, 2012, 8 pages, *Protegrity Corporation* v. *nuBridges, Inc.*, (District of Connecticut) (Case No. 3:10-cv-00809-RNC).

Defendant Voltage Security, Inc.'s Motion for Stay Pending Reexamination, Dec. 27, 2010, 659 pages, *Protegrity Corporation* v. *Voltage Security, Inc.*, (District of Connecticut) (Case No. 3:10-cv-00755-RNC).

Protegrity's Opposition to Voltage's Motion to Stay [Dkt. 38], Jan. 18, 2011, 103 pages, *Protegrity Corporation* v. *Voltage Security, Inc.*, (District of Connecticut) (Case No. 3:10-cv-00755-RNC).

Reply in Support of Defendant Voltage Security, Inc.'s Motion for Stay Pending Reexamination, Feb. 1, 2011, 137 pages, *Protegrity Corporation* v. *Voltage Security, Inc.*, (District of Connecticut) (Case No. 3:10-cv-00755-RNC).

Protegrity's Motion to Dismiss Inequitable Conduct Counterclaim, Strike Fourth Affirmative Defense, and Incorporated Memorandum of Law, Mar. 9, 2012, 8 pages, *Protegrity Corporation* v. *Voltage Security, Inc.*, (District of Connecticut) (Case No. 3:10-cv-00755-RNC).

Joint Claim Construction Statement, Dec. 13, 2010, 19 pages, *Protegrity Corporation* v. *Voltage Security, Inc.*, (District of Connecticut) (Case No. 3:10-cv-00755-RNC).

Defendants' Opening Claim Construction Brief for the '201 and '129 Patents, Mar. 13, 2012, 36 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Stipulation and [Proposed] Order for Filing of Voltage's Second Amended Answer to Plaintiff's First Amended Complaint, Affirmative Defenses, and Counterclaims, Apr. 6, 2012, 32 pages, *Protegrity Corporation* v. *Voltage Security, Inc.*, (District of Connecticut) (Case No. 3:10-cv-00755-RNC).

Voltage's Opposition to Protegrity's Motion to Dismiss Inequitable Conduct Counterclaim and Strike Fourth Affirmative Defense, Apr. 6, 2012, 2 pages, *Protegrity Corporation* v. *Voltage Security, Inc.*, (District of Connecticut) (Case No. 3:10-cv-00755-RNC).

Protegrity's Brief in Opposition to Defendants' Claim Construction for the '201 and '129 Patents [Ingrian Dkt. 186], [Voltage Dkt. 139], [Nubridges Dkt. 89], Apr. 9, 2012, 78 pages, *Protegrity Corporation* v. *Ingrian Networks, Inc.* and *Safenet, Inc.*, (District of Connecticut) (Case No. 3:08-cv-00618-RNC), *Protegrity Corporation* v. *Voltage Security, Inc.*, (District of Connecticut) (Case No. 3:10-cv-755-RNC), *Protegrity Corporation* v. *nuBridges, Inc.*, (District of Connecticut) (Case No. 3:10-cv-809-RNC).

Protegrity's Motion to Dismiss Inequitable Conduct Counterclaims, Strike Fourth Affirmative Defense, and Incorporated Memorandum of Law, Jun. 4, 2012, 626 pages, *Protegrity Corporation* v. *Voltage Security, Inc.*, (District of Connecticut) (Case No. 3:10-cv-00755-RNC).

Voltage's Amended Answer to Plaintiff's First Amended Complaint, Affirmative Defenses, and Counterclaims, Jun. 21, 2012, 26 pages, *Protegrity Corporation* v. *Voltage Security, Inc.*, (District of Connecticut) (Case No. 3:10-cv-00755-RNC).

Protegrity's Motion to Dismiss Inequitable Conduct Counterclaims and Strike Fourth Affirmative Defense from Defendant's Third Amended Answer [Dkt. 177-1], and Incorporated Memorandum of Law, Jul. 23, 2012, 627 pages, *Protegrity Corporation* v. *Voltage Security, Inc.*, (District of Connecticut) (Case No. 3:10-cv-00755-RNC).

Voltage's Opposition to Protegrity's Motion to Dismiss Inequitable Conduct Counterclaims and to Strike Fourth Affirmative Defense from Defendant's Third Amended Answer [Dkt. 177-1], Aug. 13, 2012, 97 pages, *Protegrity Corporation* v. *Voltage Security, Inc.*, (District of Connecticut) (Case No. 3:10-cv-00755-RNC).

\* cited by examiner

DATA SECURITY SYSTEM FOR A DATABASE

CROSS-REFERENCE TO RELATED APPLICATIONS

This application is a continuation under 35 U.S.C. §120 of U.S. patent application Ser. No. 11/603,967, filed Nov. 21, 2006, which is a continuation under 35 U.S.C. §120 of U.S. patent application Ser. No. 09/840,188, filed Apr. 24, 2001, which is a continuation under 35 U.S.C. §120 of U.S. patent application Ser. No. 09/027,585, filed Feb. 23, 1998, which is the national stage application pursuant to 35 U.S.C. §371 of International Application No. PCT/SE97/01089, filed Jun. 18, 1997. The contents of each patent application are hereby incorporated by reference in their entirety.

TECHNICAL FIELD

The present invention relates to the technical field of computer-aided information management, and concerns more specifically a method and an apparatus for data processing according to the preamble to claim 1 and claim 8, respectively, for accomplishing increased protection against unauthorised processing of data.

BACKGROUND ART

In the field of computer-aided information management, it is strongly required that the protection against unauthorised access of data registers be increased, especially against violation of the individual's personal integrity when setting up and keeping personal registers, i.e. registers containing information on individuals. In particular, there are regulations restricting and prohibiting the linking and matching of personal registers. Also in other fields, such as industry, defence, banking, insurance, etc, improved protection is desired against unauthorised access to the tools, databases, applications etc. that are used for administration and storing of sensitive information.

Figure 1:
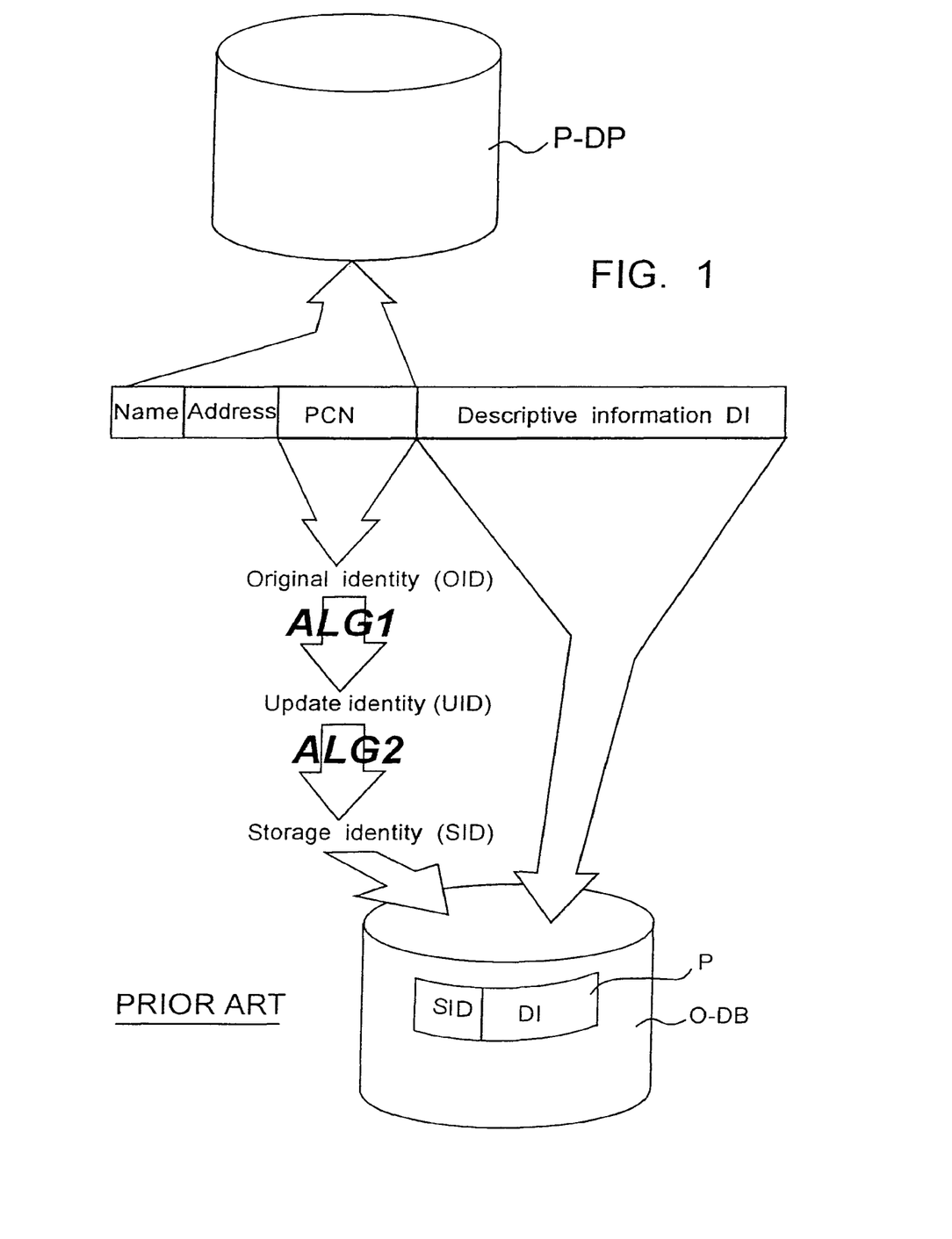
FIG. 1 (prior art) schematically shows the principle of storing of data information according to the PTY principle in WO95/15628.
Figure 2:
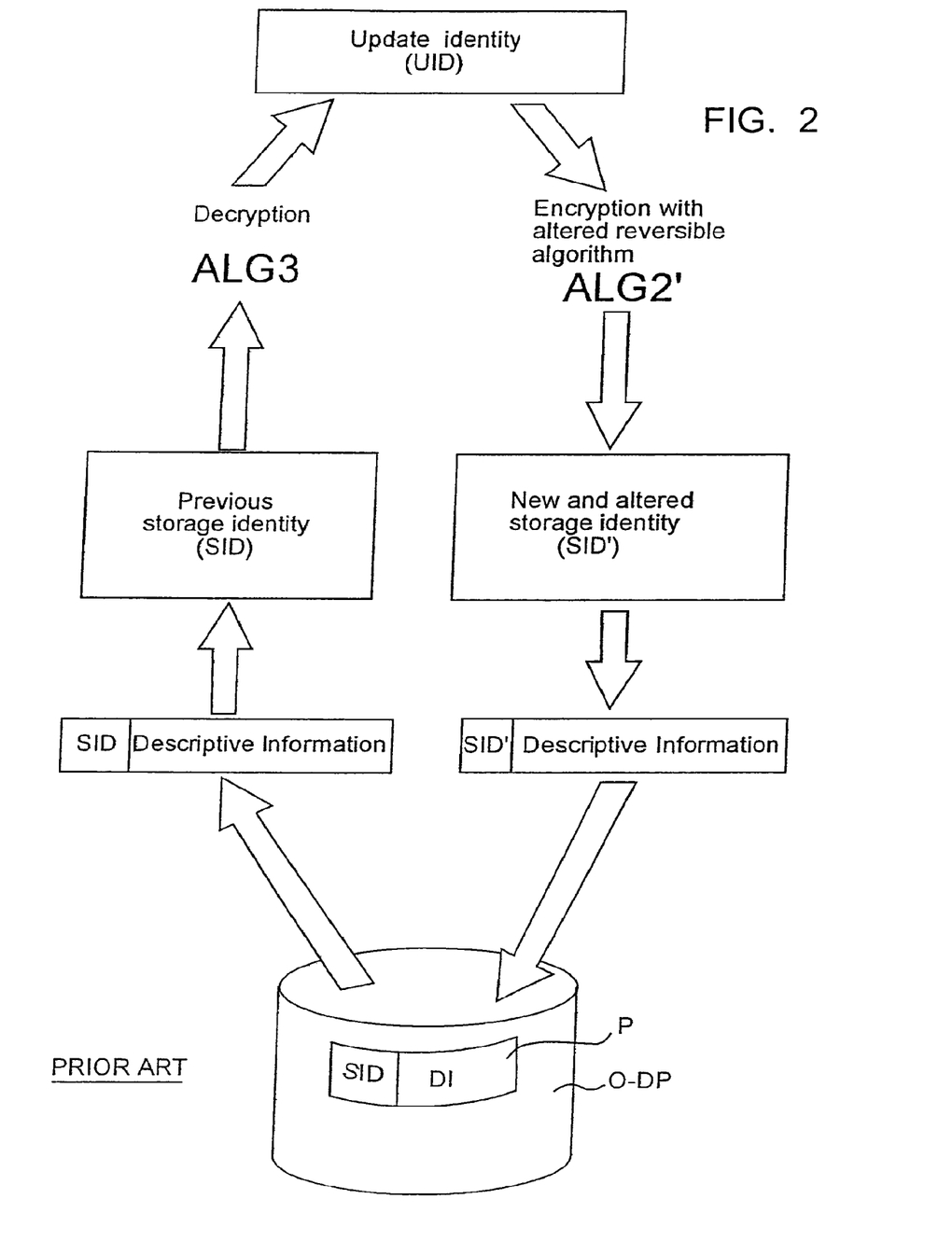
FIG. 2 (prior art) schematically shows the principle of producing floating storing identities according to the PTY principle in WO95/15628.

WO95/15628, which has the same owner as the present application, discloses a method for storing data, which results in increased possibilities of linking and matching with no risk of reduced integrity. The method, which is illustrated schematically in FIGS. 1 and 2 on the enclosed drawing sheets, concerns storing of information comprising on the one hand an identifying piece of information or original identity OID, for instance personal code numbers Pcn and, on the other hand, descriptive information DI. The information OID+DI is stored as records P in a database O-DB according to the following principle:

Step 1 OID (Pcn) is encrypted by means of a first, preferably non-reversible algorithm ALG1 to an update identity UID;

Step 2 UID is encrypted by means of a second, reversible algorithm ALG2 to a storage identity SID;

Step 3 SID and DI are stored as a record P in the database O-DB, SID serving as a record identifier;

Step 4 At predetermined times, an alteration of SID in all or selected records P is accomplished by SID of these records being decrypted by means of a decrypting algorithm ALG3 to UID, whereupon UID is encrypted by means of a modified second, reversible algorithm or ALG2' to a new storage identity SID', which is introduced as a new record identifier in the associated record P as replacement for previous SID. This results in a security-enhancing "floating" alteration of SID of the records.

For a closer description of the details and advantages of this encrypting and storing method, reference is made to WO95/15628, which is to be considered to constitute part of the present description. The storing principle according to steps 1-4 above is below referred to as PTY, which is an abbreviation of the concept PROTEGRITY which stands for "Protection and Integrity".

A detailed technical description of PTY is also supplied in the document "PROTEGRITY (ASIS) Study 2", Ver. 1.2, 1 Mar. 1996, by Leif Jonson. Also this document is to be considered to constitute part of the present description.

In the technical field at issue, so-called shell protections, however, are today the predominant method of protection. Shell protection comprises on the one hand the external security (premises) and, on the other hand, an authorisation check system ACS with user's passwords for controlling the access. ACS is used as shell protection for main frames, client/server systems and PC, but it does not give full protection and the information at issue can often relatively easily be subjected to unauthorised access. This protection has been found more and more unsatisfactory since, to an increasing extent, "sensitive" information is being stored, which must permit managing via distribution, storing and processing in dynamically changing environments, especially local distribution to personal computers. Concurrently with this development, the limits of the system will be more and more indistinct and the effect afforded by a shell protection deteriorates.

SUMMARY OF THE INVENTION

In view of that stated above, the object of the present invention is to provide an improved method for processing information, by means of which it is possible to increase the protection against unauthorised access to sensitive information.

A special object of the invention is to provide a technique for data processing or managing, which makes it possible for the person responsible for the system, the management of the organisation etc. to easily establish and continuously adapt the user's possibility of processing stored information that is to be protected.

A further object of the invention is to provide a technique for data processing which offers protection against attempts at unauthorised data processing by means of non-accepted software.

One more object of the invention is to provide a technique for data processing according to the above-mentioned objects, which can be used in combination with the above-described PTY principle, for providing a safety system with an extremely high level of protection.

These and other objects of the invention are achieved by the method according to claim 1 and the apparatus according to claim 8, preferred embodiments of the invention being stated in the dependent claims.

Thus, the invention provides a method for processing of data that is to be protected, comprising the measure of storing the data as encrypted data element values of records in a first database (O-DB), each data element value being linked to a corresponding data element type.

The inventive method is characterised by the following further measures:

storing in a second database (IAM-DB) a data element protection catalogue, which for each individual data element type contains one or more protection attributes stating processing rules for data element values, which in the first database are linked to the individual data element type, in each user-initiated measure aiming at processing of a given data element value in the first database, initially producing a compelling calling to the data element protection catalogue for collecting the protection attribute/attributes associated with the corresponding data element type, and compellingly controlling the processing of the given data element value in conformity with the collected protection attribute/attributes.

In the present application the following definitions are used:
- "Processing" may include all kinds of measures which mean any form of reading, printing, altering, coding, moving, copying etc. of data that is to be protected by the inventive method.
- "Data element type" concerns a specific type of data having a meaning as agreed on.
- "Data element value" concerns a value which in a given record specifies a data element type.
- "Record" concerns a number of data element values which belong together and which are linked to the respective data element types, optionally also including a record identifier, by means of which the record can be identified. Example:

|  | DATA ELEMENT TYPE | |
|---|---|---|
| RECORD ID | SOCIAL ALLOWANCE | CAR |
| XXXX XXXXX | encrypted data element value | encrypted data element value |
| YYYY YYYYY | encrypted data element value | encrypted data element value |

- "Protection attribute indicating rules of processing" may concern:
    - data stored in the data element protection catalogue and providing complete information on the rule or rules applying to the processing of the corresponding data element, and/or
    - data stored in the data element protection catalogue and requiring additional callings to information stored in some other place, which, optionally in combination with the protection attributes, states the processing rules involved.
- "Collection of protection attributes" may concern:
    - collection of the protection attributes in the form as stored in the data element protection catalogue, and
    - collection of data recovered from the protection attributes, for instance by decryption thereof.
- "Encryption" may concern any form of encryption, tricryption, conversion of coding of plain-text data to non-interpretable (encrypted) data, and is especially to concern also methods of conversion including hashing.

The inventive method offers a new type of protection, which differs essentially from the prior-art shell protection and which works on the cell or data element level. Each data element type used in the records in the first database is thus associated with one or more protection attributes, which are stored in a separate data element protection catalogue and which protection attributes state rules of how to process the corresponding data element values. It should be particularly noted that the calling to the data element protection catalogue is compelling. This means that in a system, in which the method according to the invention is implemented, is such as to imply that a user, who for instance wants to read a certain data element value in a given record in the first database, by his attempt at access to the data element value automatically and compellingly produces a system calling to the data element protection catalogue in the second database for collecting the protection attributes associated with the corresponding data element types. The continued processing procedure (reading of data element value) of the system is also controlled compellingly in accordance with the collected protection attribute/attributes applying to the corresponding data element types.

The term "data element protection catalogue" and the use thereof according to the invention must not be confused with the known term "active dictionary", which means that, in addition to an operative database, there is a special table indicating different definitions or choices for data element values in the operative database, for instance that a data element value "yellow" in terms of definition means a colour code which is within a numeric interval stated in such a reference table.

Preferably, the processing rules stated by the protection attributes are inaccessible to the user, and the read or collected protection attributes are preferably used merely internally by the system for controlling the processing. A given user, who, for instance, wants to read information stored in the database regarding a certain individual, thus need not at all be aware of the fact that certain protection attributes have been activated and resulted in certain, sensitive information for this individual being excluded from the information that is made available on e.g. a display. Each user-initiated measure aiming at processing of data element values thus involves on the one hand a compelling calling to the data element protection catalogue and, on the other hand, a continued processing which is compellingly subjected to those processing rules that are stated by the protection attributes, and this may thus be accomplished without the user obtaining information on what rules control the processing at issue, and especially without the user having any possibility of having access to the rules.

By altering, adding and removing protection attributes in the data element protection catalogue, the person responsible for the system or an equivalent person may easily determine, for each individual data element type, the processing rules applying to data element values associated with the individual data element type and thus easily maintain a high and clear safety quality in the system.

According to the invention, it is thus the individual data element (date element type) and not the entire register that becomes the controlling unit for the way in which the organisation, operator etc. responsible for the system has determined the level of quality, responsibility and safety regarding the management of information.

To obtain a high level of protection, the data element protection catalogue is preferably encrypted so as to prevent unauthorised access thereto.

As preferred protection attributes, the present invention provides the following possibilities, which, however, are to be considered an incomplete, exemplifying list:
1. Statement of what "strength" or "level" (for instance none, 1, 2 . . . ) of encryption is to be used for storing the corresponding data element values in the database. Different data element values within one and the same record may thus be encrypted with mutually different strength.
2. Statement of what "strength" or "level" (for instance none, 1, 2, . . . ) of encryption is to be used for the corresponding data element values if these are to be transmitted on a net.
3. Statement of program and/or versions of program that are authorised to be used for processing the corresponding data element values.
4. Statement of "owner" of the data element type. Different data element values within one and the same record can thus have different owners.

5. Statement of sorting-out rules for the corresponding data element values, for instance, statement of method and time for automatic removal of the corresponding data element values from the database.
6. Statement whether automatic logging is to be made when processing the corresponding data element values.

According to a specially preferred embodiment of the invention, the above-described PTY storing method is used for encryption of all data that is to be encrypted in both the database (i.e. the data element values) and the data element protection catalogue (i.e. the protection attributes). In the normal case where each record has a record identifier (corresponding to SID above), preferably also the record identifier is protected by means of PTY. Specifically, a floating alteration of the record identifiers in both the operative database and the data element protection catalogue can be made at desired intervals and at randomly selected times, in accordance with the above-described PTY principle. In the preferred embodiment, especially the encapsulated processor which is used for the PTY encryption can also be used for implementation of the callings to the data element protection catalogue and the procedure for processing according to the collected protection attributes.

The invention will now be explained in more detail with reference to the accompanying drawings, which schematically illustrate the inventive principle implemented in an exemplifying data system.

DESCRIPTION OF THE PREFERRED EMBODIMENT

In the following, the designation IAM (which stands for Information Assets Manager) will be used for the components and applications which in the embodiment are essential to the implementation of the invention.

Figure 3:
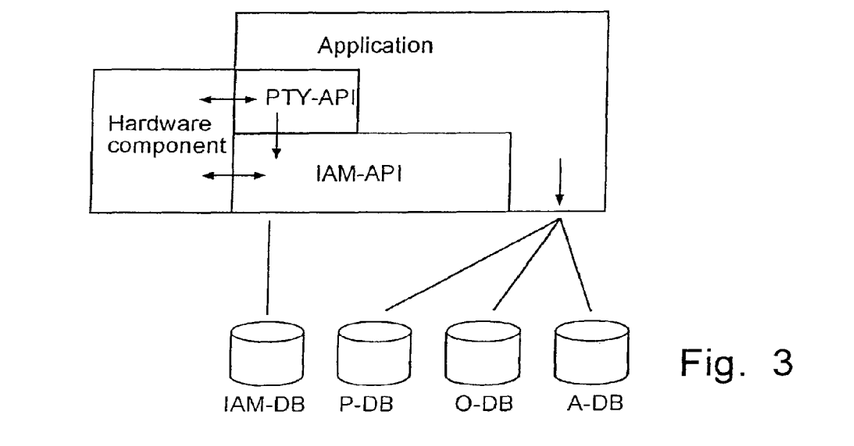
FIG. 3 schematically shows a computer system for implementing the method according to the invention.

Reference is first made to FIG. 3, which schematically illustrates a data managing system, in which the present invention is implemented and in which the following databases are included for storing information, in this example person-related information:

An open database P-DB which contains generally accessible data, such as personal name, article name, address etc. with the personal code number Pcn as plain text as record identifier;

An operative database O-DB, which contains data that is to be protected. Encrypted identification, in this case an encrypted personal code number, is used as record identifier (=storage identity SID). O-DB is used by authorised users for processing of individual records, such as reading and update;

An archive-database A-DB, which contains data transferred (sorted out) from the operative database O-DB and which is used for statistic questions, but not for questions directed to individual records. The transfer from O-DB to A-DB may take place in batches.

A database IAM-DB, which is a database essential to the implementation of the invention. This database contains a data element protection catalogue with protection attributes for such data element types as are associated with data element values in records in the operative database O-DB. This database IAM-DB is preferably physically separated from the other O-DB and is inaccessible to the user. However, two or more sets of the data element protection catalogue may be available: on the one hand an original version to which only an authorised IAM operator has access and, on the other hand, a copy version which imports the data element protection catalogue from the original version and which may optionally be stored on the same file storage as the operative database O-DB. The two versions may be remote from each other, for instance be located in two different cities.

The data system in FIG. 3 further comprises a hardware component 10, a control module 20 (IAM-API), and a program module 30 (PTY-API). The function of these three components will now be described in more detail.

Hardware Component 10

The hardware component 10 acts as a distributed processor of its own in a computer. It has an encapsulation that makes it completely tamper-proof, which means that monitoring by so-called trace tools will not be possible.

The hardware component 10 can as an independent unit perform at least the following functions:

Creating variable, reversible and non-reversible encrypting algorithms for the PTY encryption and providing these algorithms with the necessary variables;

Initiating alterations of storage identities (SID) in stored data according to PTY, on the one hand data in O-DB and, on the other hand, data in the data element protection catalogue of IAM-DB;

Storing user authorisations having access to records in O-DB; and

Linking original identities OID to the correct record in O-DB.

Control Module 20 (IAM-API)

The control module controls the handling of the types of data protection that the system can supply.

The control module carries out the processing requested via API (Application Program Interface) programming interface.

Program Module 30 (PPTY-API) 30

The program module (PTY-API) 30 handles the dialogue between the application 40 involved (including ACS) and the hardware component 10. This module may further log events and control sorting out/removal of data from the operative database O-DB.

Figure 4:
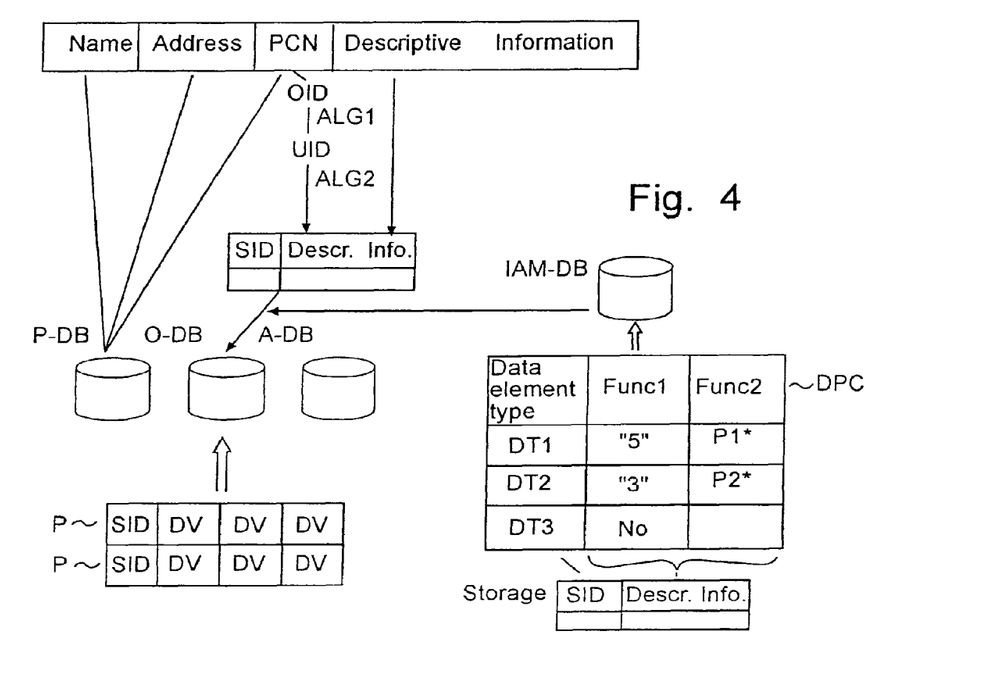
FIG. 4 schematically shows the principle of data processing according to the invention with compelling callings to a data element protection catalogue.

Reference is now made to FIG. 4, which illustrates the same four databases (P-DB, O-DB, A-DB, IAM-DB) as in FIG. 3 and which schematically illustrates how the processing of individual data elements are, according to the invention, controlled according to the rules that are stated by protection attributes in the data element protection catalogue, which is stored in the database IAM-DB.

The data that is to be stored concerns in this example a certain individual and contains: (1) generally accessible data such as name and address, (2) identifying information, such as personal code number (Pcn), and (3) descriptive information (DI). The generally accessible data name and address is stored together with personal code number (Pcn) in the open database P-DB, said storage being performable as plain text since this information is of the type that is generally accessible.

For storing the identifying information in combination with the descriptive information DI, the following steps will, however, be made, in which the following designations are used to describe encrypting and decrypting algorithms. Generally speaking, the encrypting and decrypting algorithms can be described as follows:

$$F_{Type}(\text{Random number, Input data}) = \text{Results}$$

wherein:
F designates a function.
Type indicates the type of function as follows:
  $F_{KIR}$=Non-reversible encrypting algorithm
  $F_{KR}$=Reversible encrypting algorithm
  $F_{DKR}$=Decrypting algorithm
Random number
  represents one or more constants and/or variables included in the function F.
Input data
  are the data to be encrypted or decrypted, and
Results indicate a unique function value for a given function
Step 1 Division of the Information
  Identifying information is separated from descriptive information;
Step 2 Preparation of Storage Identity SID:
  An original identity OID is selected based on the identifying information. OID is here selected to be equal to the personal code number Pcn of the individual. OID is encrypted by means of a non-reversible encrypting algorithm ALG1, prepared randomly by the hardware component 10, to an update identity UID as follows:

ALG1: $F_{KIR}$(Random number, OID)=UID

ALG1 is such that attempts at decryption of UID to OID result in a great number of identities, which makes it impossible to link a specific UID to the corresponding OID.
  Then UID is encrypted by means of a reversible algorithm ALG2, which is also produced at random by the hardware component 10, for generating a storage identity SID as follows:

ALG2: (Random number, UID)=SID

ALG2 is such that there exists a corresponding decrypting algorithm ALG3, by means of which SID can be decrypted in order to recreate UID.
  The storage identity SID is used, as described in step 4 above, as encrypted record identifier when storing encrypted data element values DV in the operative database O-DB.
Step 3 Production of Encrypted Data Element Values DV:
  The descriptive information DI associated with the original identity OID is converted into one or more encrypted data element values DV linked to a data element type DT each.
  The encryption takes place as described below with a reversible encryption function $F_{KR}$, which like the algorithms ALG1 and ALG2 above is also produced at random by the hardware component 10. The invention is distinguished by a compelling calling here being sent to the data element protection catalogue in the database IAM-DB for automatic collection of the protection attribute which is linked to the data element type at issue and which indicates "strength" or degree with which the encryption of the descriptive data is to be performed so as to generate the data element value DV.

The table, which in FIG. 4 is shown below the database IAM-DB, symbolises an exemplifying content of the data element protection catalogue, here designated DC. As an example, it may here be assumed that the protection function Func1 corresponds to "degree of encryption". If the descriptive information DI at issue is to be stored as a data element value associated with the specific data element type DT1 in the data element protection catalogue, the protection attribute "5" registered in the data element protection catalogue is collected automatically in this case. The descriptive information DI at issue will thus, automatically and compellingly, be encrypted with the strength "5" for generating an encrypted data element value DV as follows:

$$F_{KR}(\text{Random number, DI}) = \text{encrypted data element value DV}$$

For storing a less sensitive data element, for instance a data element of the data element type DT3, the compelling calling to the data element protection catalogue in IAM-DB would instead have resulted in the protection attribute "no" being collected, in which case no encryption would have been made on the descriptive data at issue, which then could be stored as plain text in the operative database ODB.

Step 4 Storing of Records in the Operative Database O-DB:
  The encrypted storage identity SID according to step 2 in combination with the corresponding encrypted data element value or data element values DV according step 3 are stored as a record in the operative database O-DB.

As appears from the foregoing, a stored information record P has the following general appearance:

| | Descript. information in the form of encrypted data element values | | | |
|---|---|---|---|---|
| Storage identity (SID) | DV1 | DV2 | DV3 | DV4 |

The original identity OID is encrypted according to the PTY principle in two steps, of which the first is non-reversible and the second is reversible. Thus, it is impossible to store the descriptive information DI along with a storage identity SID that never can be linked to the original identity OID, as well as to create "floating", i.e. which change over time, storage identities SID while retaining the possibility of locating, for a specific original identity OID, the associated descriptive information DI stored.

The descriptive data DI is stored in accordance with protection attributes linked to each individual data element. This results in a still higher level of protection and a high degree of flexibility as to the setting up of rules, and continuous adaptation thereof, of how sensitive data is allowed to be used and can be used, down to the data element level.

To increase the level of protection still more, the data element protection catalogue DC is preferably stored in IAM-DB in encrypted form in accordance with the PTY principle, in which case for instance the data element types correspond to the above storage identity and the protection attributes correspond to the descriptive information or data element values above, as schematically illustrated in FIG. 4. This efficiently prevents every attempt at circumventing the data element protection by unauthorised access and interpretation of the content of the data element protection catalogue.

In the illustrated embodiment, PTY can thus have the following functions:

Protecting the original identity OID in encrypted form (SID) on the operative database O-DB (as is known from said WO95/15628), Protecting information in IAM-DB, particularly the protection attributes of the data element protection catalogue and the associated record identifier, and Protecting descriptive information DI in the form of encrypted data element values DV for the data element types that have the corresponding protection activated in the data element protection catalogue, and in accordance with the corresponding protection attributes.

Functionality Protection

In the above embodiment of the procedure for inputting data in the operative database O-DB, only "degree of encryption" has so far been discussed as data element protection attribute in the data element protection catalogue DC. However, this is only one example among a number of possible protection attributes in the data element protection catalogue, which normally offers a plurality of protection attitudes for each data element. Preferred protection attributes have been indicated above in the general description.

A particularly interesting protection attribute is "protected programs". The use of this data element protection attribute means that the data system may offer a new type of protection, which is here called "functionality protection" and which means that only accepted or certified programs are allowed to be used and can be used in the system in the processing of data. It should be noted that this type of protection is still, according to the invention, on the data element level.

Now assume for the purpose of illustration that Func2 in the data element protection catalogue DC in FIG. 4 corresponds to this protection attribute and that data elements of the data element type DT1 and DT2, respectively, are only allowed to processed with the accepted applications or programs P1 and P2, respectively. Unauthorised handling of the corresponding data elements by means of, for instance, a different program P3, or a modified version P1' of P1, should be prevented. As protection attribute in the data element protection catalogue, data identifying P1 and P2 is therefore stored. In a preferred example, an encryptographic check sum P1* and P2*, respectively, is created, in a manner known per se, based on every accepted program P1 and P2, respectively. These check sums may be considered to constitute a unique fingerprint of the respective accepted programs, and these fingerprints can be stored as protection attributes in the data element protection catalogue as illustrated schematically in FIG. 4. It should however be noted that such check sums for accepted programs can optionally be stored in a data element protection catalogue of their own for registering of accepted programs, separately from the data element protection catalogue with protection attributes for encryption strength.

If the last-mentioned type of protection "protected programs" is used, it should also be noted that the system, in connection with a user-initiated measure aiming at processing of a given data element, for instance inputting a new data element value in a certain record, need not carry out a complete examination of all programs accepted in the system. If, for instance, the user tries to use a program P3 for inputting in the operative database O-DB a new data element value, a compelling calling is sent to the data element protection catalogue in connection with the corresponding data element type, for instance DT1. The associated protection attribute P1* is then collected from the data element protection catalogue, which means that such a data element value is only allowed to be stored by means of the program P1. The attempt at registering the data element value by means of the program P3 would therefore fail.

By periodic use of the above-described functionality protection, it is possible to reveal and/or prevent that an unauthorised person (for instance a "hacker") breaks into the system by means of a non-accepted program and modifies and/or adds descriptive data in such a manner that the descriptive data will then be identifying for the record. The data element values are thus not allowed to become identifying in the operative database O-DB.

Traceability/Logging

"Logging" or "traceability" is another type of protection which according to the invention can be linked to a data element type in the data element protection catalogue. If this protection is activated for a certain data element type, each processing of the corresponding data element values in the operative database O-DB will automatically and compellingly result in relevant information on the processing ("user", "date", "record", "user program" etc.) being logged in a suitable manner, so that based on the log, it is possible to investigate afterwards who has processed the data element values at issue, when, by means of which program etc.

Reading of Data from the Operative Database O-DB

In connection with a user-initiated measure aiming at reading/altering data element values in the stored records in the operative database O-DB, the following steps are carried out, which specifically also comprise a compelling calling to the data element protection catalogue and "unpacking" of the data which is controlled automatically and compellingly by collected protection attributes.

Step 1 The record is identified by producing the storage identity SID at issue based on the original identity OID, (Pcn) that is associated with the data element value DV which is to be read, as follows $$F_{KR}(F_{KIR}(\text{OID}))=\text{SID}$$

Step 2 When the record has been found by means of SID, the encrypted data element value DV (i.e. the encrypted descriptive data that is to be read) is decrypted as follows by means of a decrypting algorithm $F_{DKR}$:

$$F_{DKR}(\text{DV})=\text{descriptive data (plain text)}$$

The carrying out of this decryption of the data element value, however, requires that the encryption-controlling protection attribute of the data element is first collected by the system from the data element protection catalogue DC, i.e. the attribute indicating with which strength or at which level the data element value DV stored in O-DB has been encrypted. Like in the above procedure for inputting of data in O-DB, also when reading, a compelling calling thus is sent to the data element protection catalogue DC for collecting information which is necessary for carrying out the processing, in this case the unpacking.

It will be appreciated that such a compelling calling to the data element protection catalogue DC, when making an attempt at reading, may result in the attempt failing, wholly or partly, for several reasons, depending on the protection attribute at issue, which is linked to the data element value/values that is/are to be read. For instance, the attempt at reading may be interrupted owing to the user trying to use a non-accepted program and/or not being authorised to read the term involved.

If the data element protection catalogue is encrypted, the decoding key can be stored in a storage position separate from the first and the second database.

Figure 5:
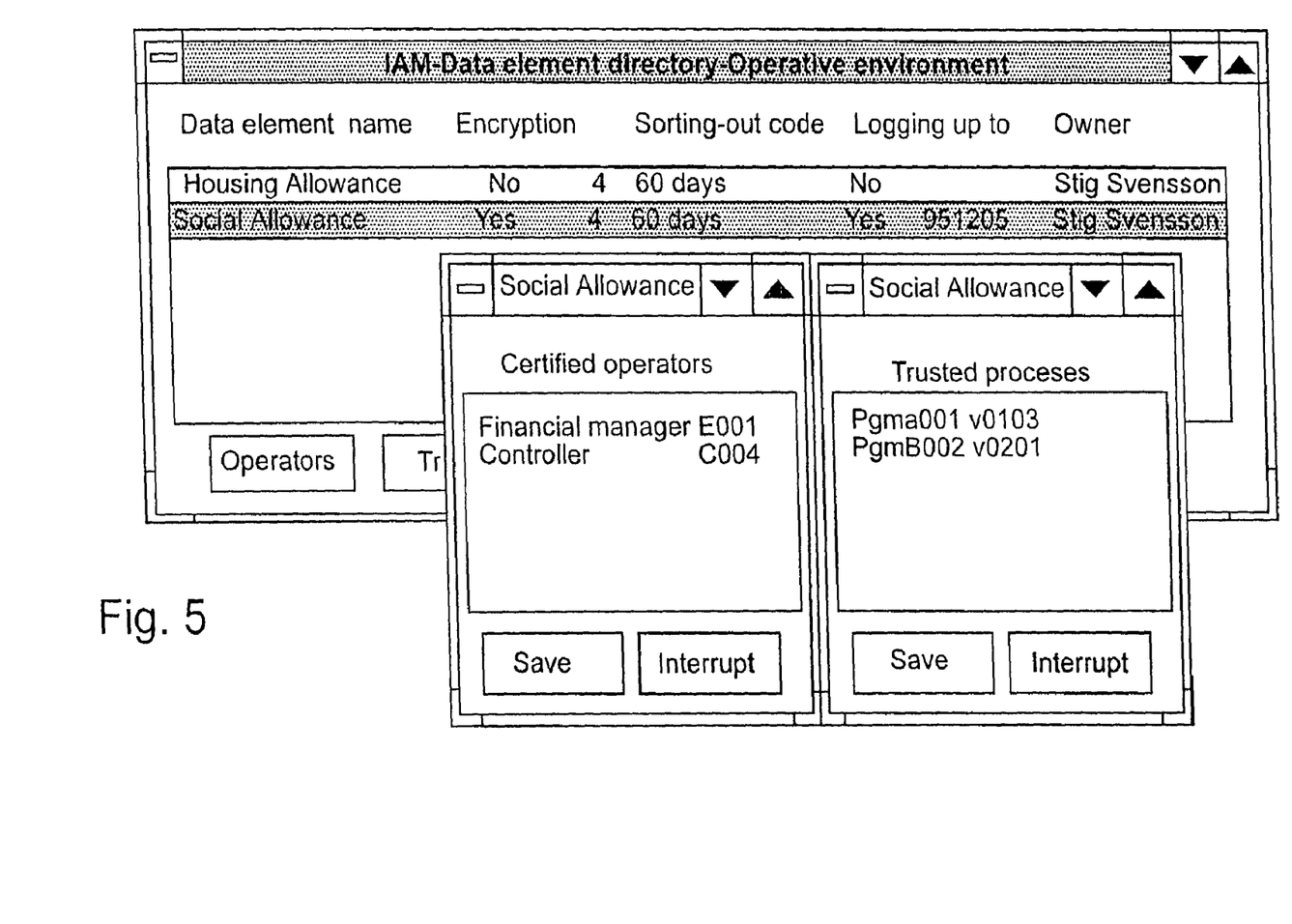
FIG. 5 shows an example of a display image for determining of protection attributes in the data element protection catalogue.

FIG. 5 shows an example of a user interface in the form of a dialogue box, by means of which a person responsible for IAM, i.e. a person responsible for security, may read and/or alter the protection attributes stated in the data element protection catalogue. In the Example in FIG. 5, the data element types "Housing allowance" and "Social allowance" have both been provided with protection attributes concerning encryption, sorting out, logging and owner. Moreover, registration of authorised users and protected programs linked to the data element type "Social allowance" has taken place in sub-menus.

The invention claimed is:

1. A computer-implemented data processing method comprising:
   maintaining a database comprising a plurality of data portions;
   maintaining a separate data protection table comprising, for each of one or more data portions, a plurality of data processing rules associated with the data portion that must each be satisfied before the data portion can be accessed;
   receiving a request to access a data portion;
   determining whether each of the one or more data processing rules associated with the requested data portion are satisfied; and
   granting access to the requested data portion responsive to each of the one or more data processing rules associated with the requested data portion being satisfied.

2. The method of claim 1, wherein at least one of the data processing rules restricts access to an associated data portion to a specified user or group of users.

3. The method of claim 1, wherein at least one of the data processing rules restricts access to an associated data portion to a specified program or group of programs.

4. The method of claim 3, wherein a data processing rule restricting access to an associated data portion to a specified program further restricts access to a specified version of the program.

5. The method of claim 1, wherein the requested data portion comprises a column of data in the database.

6. The method of claim 1, wherein the requested data portion comprises a field of data in the database.

7. The method of claim 1, wherein at least one of the data processing rules restricts access to an associated data portion to users or programs that use a specified level of encryption to subsequently store accessed data in the database.

8. The method of claim 1, wherein at least one of the data processing rules restricts access to an associated data portion to users or programs that use a specified level of encryption to subsequently transmit accessed data.

9. The method of claim 1, wherein at least one of the data processing rules restricts access to an associated data portion to users or programs that are owners of the subset of data.

10. The method of claim 1, wherein at least one of the data processing rules specifies a time and method of removal for the data portion, and wherein access to the data portion is restricted based on the specified time and method of removal.

11. The method of claim 1, wherein at least one of the data processing rules specifies that activity logging is to occur during access to an associated data portion, and wherein access to the data portion is restricted based on whether activity logging is occurring.

12. The method of claim 1, wherein the requested data portion is encrypted with a first cryptographic key, and wherein at least one data processing rule associated with the requested data portion restricts access to the requested data portion to users or programs that possess the first cryptographic key.

13. The method of claim 1, wherein a first portion of the requested data portion is encrypted with a first cryptographic key, wherein a second portion of the requested data portion is encrypted with a second cryptographic key, and wherein at least one data processing rule associated with the requested data portion restricts access to the first portion of the requested data portion to users or programs that possess the first cryptographic key and restricts access to the second portion of the requested data portion to users or programs that possess the second cryptographic key.

14. The method of claim 1, wherein the requested data portion is encrypted with a cryptographic key, and wherein granting access to the requested data portion comprises providing the cryptographic key to a requesting entity.

15. The method of claim 1, wherein each of the plurality of data portions within the database is associated with a different data type.

16. The method of claim 1, wherein at least one data portion comprises encrypted data.

17. A computer system, comprising:
   a database storing a plurality of data portions;
   a data protection table comprising, for each of one or more data portions, a plurality of data processing rules associated with the data portion that must each be satisfied before the data portion can be accessed; and
   a processor configured to:
      in response to a request to access a data portion, determine whether each of the one or more data processing rules associated with the requested data portion are satisfied; and
      grant access to the requested data portion responsive to each of the retrieved one or more data processing rules being satisfied.

18. The computer system of claim 17, wherein at least one of the data processing rules restricts access to an associated data portion to a specified user or group of users.

19. The computer system of claim 17, wherein at least one of the data processing rules restricts access to an associated data portion to a specified program or group of programs.

20. The computer system of claim 17, wherein a data processing rule restricting access to an associated data portion to a specified program further restricts access to a specified version of the program.

21. The computer system of claim 17, wherein the requested data portion comprises a column of data in the database.

22. The computer system of claim 17, wherein the requested data portion comprises a field of data in the database.

23. The computer system of claim 17, wherein at least one of the data processing rules restricts access to an associated data portion to users or programs that use a specified level of encryption to subsequently store accessed data in the database.

24. The computer system of claim 17, wherein at least one of the data processing rules restricts access to an associated data portion to users or programs that use a specified level of encryption to subsequently transmit accessed data.

25. The computer system of claim 17, wherein at least one of the data processing rules restricts access to an associated data portion to users or programs that are owners of the subset of data.

26. The computer system of claim 17, wherein at least one of the data processing rules specifies a time and method of removal for an associated data portion, and wherein access to the data portion is restricted based on the specified time and method of removal.

27. The computer system of claim 17, wherein at least one of the data processing rules specifies that activity logging is to occur during access to an associated data portion, and wherein access to the data portion is restricted based on whether activity logging is occurring.

28. The computer system of claim 17, wherein the requested data portion is encrypted with a first cryptographic key, and wherein at least one data processing rule associated with the requested data portion restricts access to the requested data portion to users or programs that possess the first cryptographic key.

29. The computer system of claim 17, wherein a first portion of the requested data portion is encrypted with a first cryptographic key, wherein a second portion of the requested data portion is encrypted with a second cryptographic key, and wherein at least one data processing rule associated with the requested data portion restricts access to the first portion of the requested data portion to users or programs that possess the first cryptographic key and restricts access to the second portion of the requested data portion to users or programs that possess the second cryptographic key.

30. The computer system of claim 17, wherein the requested data portion is encrypted with a cryptographic key, and wherein granting access to the requested data portion comprises providing the cryptographic key to a requesting entity.

31. The computer system of claim 17, wherein each of the plurality of data portions within the database is associated with a different data type.

32. The computer system of claim 17, wherein at least one data portion comprises encrypted data.

33. A computer-implemented data processing method comprising:
maintaining a database comprising a plurality of data portions, each data portion associated with a data category;
maintaining a separate data protection table comprising, for at least one data category, one or more data processing rules associated with the data category that must each be satisfied before a data portion associated with the data category can be accessed;
receiving a request to access a data portion associated with a first data category from a user;
determining whether each of the one or more data processing rules associated with the requested data portion are satisfied; and
granting the user access to the requested data portion responsive to each of the retrieved one or more data processing rules being satisfied.

34. The method of claim 33, wherein at least one of the data processing rules associated with a data category restricts access to data portions associated with the data category to a specified user or group of users.

35. The method of claim 33, wherein at least one of the data processing rules associated with a data category restricts access to data portions associated with the data category to a specified program or group of programs.

36. The method of claim 33, wherein a data processing rule associated with a data category restricting access to data portions associated with the data category to a specified program further restricts access to a specified version of the program.

37. The method of claim 33, wherein the requested data portion comprises a column of data in the database.

38. The method of claim 33, wherein the requested data portion comprises a field of data in the database.

39. The method of claim 33, wherein at least one of the data processing rules associated with a data category restricts access to data portions associated with the data category to users or programs that use a specified level of encryption to subsequently store accessed data in the database.

40. The method of claim 33, wherein at least one of the data processing rules associated with a data category restricts access to data portions associated with the data category to users or programs that use a specified level of encryption to subsequently transmit accessed data.

41. The method of claim 33, wherein at least one of the data processing rules associated with a data category restricts access to data portions associated with the data category to users or programs that are owners of the subset of data.

42. The method of claim 33, wherein at least one of the data processing rules associated with a data category specifies that activity logging is to occur during access to data portions associated with the data category, and wherein access to the data portions is restricted based on whether activity logging is occurring.

43. The method of claim 33, wherein the requested data portion is encrypted with a first cryptographic key, and wherein at least one data processing rule associated with the first data category restricts access to the requested data portion to users or programs that possess the first cryptographic key.

44. The method of claim 33, wherein a first portion of the requested data portion is encrypted with a first cryptographic key, wherein a second portion of the requested data portion is encrypted with a second cryptographic key, and wherein at least one data processing rule associated with the first data category restricts access to the first portion of the requested data portion to users or programs that possess the first cryptographic key and restricts access to the second portion of the requested data portion to users or programs that possess the second cryptographic key.

45. The method of claim 33, wherein the requested data portion is encrypted with a cryptographic key, and wherein granting access to the requested data portion comprises providing the cryptographic key to a requesting entity.

46. The method of claim 33, wherein at least one data portion comprises encrypted data.

47. A computer system, comprising:
a database storing a plurality of data portions, each data portion associated with a data category;
a data protection table comprising, for at least one data category, one or more data processing rules associated with the data category that must each be satisfied before a data portion associated with the data category can be accessed; and
a processor configured to:
in response to a request to access a data portion associated with a first data category from a user, determine whether each of the one or more data processing rules associated with the requested data portion are satisfied; and
grant access to the requested data portion responsive to each of the retrieved one or more data processing rules being satisfied.

48. The computer system of claim 47, wherein at least one of the data processing rules associated with a data category restricts access to data portions associated with the data category to a specified user or group of users.

49. The computer system of claim 47, wherein at least one of the data processing rules associated with a data category restricts access to data portions associated with the data category to a specified program or group of programs.

50. The computer system of claim 47, wherein a data processing rule associated with a data category restricting access to data portions associated with the data category to a specified program further restricts access to a specified version of the program.

51. The computer system of claim 47, wherein the requested data portion comprises a column of data in the database.

52. The computer system of claim 47, wherein the requested data portion comprises a field of data in the database.

53. The computer system of claim 47, wherein at least one of the data processing rules associated with a data category restricts access to data portions associated with the data category to users or programs that use a specified level of encryption to subsequently store accessed data in the database.

54. The computer system of claim 47, wherein at least one of the data processing rules associated with a data category restricts access to data portions associated with the data category to users or programs that use a specified level of encryption to subsequently transmit accessed data.

55. The computer system of claim 47, wherein at least one of the data processing rules associated with a data category restricts access to data portions associated with the data category to users or programs that are owners of the subset of data.

56. The computer system of claim 47, wherein at least one of the data processing rules associated with a data category specifies that activity logging is to occur during access to data portions associated with the data category, and wherein access to the data portions is restricted based on whether activity logging is occurring.

57. The computer system of claim 47, wherein the requested data portion is encrypted with a first cryptographic key, and wherein at least one data processing rule associated with the first data category restricts access to the requested data portion to users or programs that possess the first cryptographic key.

58. The computer system of claim 47, wherein a first portion of the requested data portion is encrypted with a first cryptographic key, wherein a second portion of the requested data portion is encrypted with a second cryptographic key, and wherein at least one data processing rule associated with the first data category restricts access to the first portion of the requested data portion to users or programs that possess the first cryptographic key and restricts access to the second portion of the requested data portion to users or programs that possess the second cryptographic key.

59. The computer system of claim 47, wherein the requested data portion is encrypted with a cryptographic key, and wherein granting access to the requested data portion comprises providing the cryptographic key to a requesting entity.

60. The computer system of claim 47, wherein at least one data portion comprises encrypted data.

* * * * *